United States Patent
Bednarz et al.

[11] Patent Number: 6,071,457
[45] Date of Patent: Jun. 6, 2000

[54] BELLOWS CONTAINER PACKAGING SYSTEM AND METHOD

[75] Inventors: George A. Bednarz, Plano; Jeremias P. Libres, Dallas; Subramanian Krishnamurthy, Arlington; Thongioem Phanatnok, Dallas, all of Tex.

[73] Assignee: Texas Instruments Incorporated, Dallas, Tex.

[21] Appl. No.: 09/159,420

[22] Filed: Sep. 24, 1998

Related U.S. Application Data

[60] Provisional application No. 60/060,398, Sep. 30, 1997.

[51] Int. Cl.[7] .......................... B29C 31/06; B29C 45/02; B29C 45/14
[52] U.S. Cl. .................. 264/272.17; 264/328.5; 425/116; 425/129.1; 425/544
[58] Field of Search ..................... 425/116, 117, 425/129.1, 544; 264/272.17, 328.5

[56] References Cited

U.S. PATENT DOCUMENTS

| | | | |
|---|---|---|---|
| 4,963,307 | 10/1990 | Sakai et al. | 264/272.17 |
| 5,043,199 | 8/1991 | Kubota et al. | 264/328.5 |
| 5,098,626 | 3/1992 | Pas | 264/328.5 |
| 5,888,443 | 3/1999 | Bolanos et al. | 264/272.17 |
| 5,891,377 | 4/1999 | Libres et al. | 264/272.17 |

*Primary Examiner*—Robert Davis
*Attorney, Agent, or Firm*—Jacqueline J. Garner; Wade James Brady; Richard L. Donaldson

[57] ABSTRACT

An improved mold system (20) is provided. The mold system (20) includes a mold (30) having at least one mold cavity (28). A pot (22) is connected to each of the mold cavities (28) through a runner system (24). A bellows container (50) containing a molding material (60) is disposed with the pot (22). A plunger (31) applies a compressive load to the molding material (60) contained with the bellows container (50) to force the molding material (60) through the runner system (24) into the mold cavities (28).

20 Claims, 2 Drawing Sheets

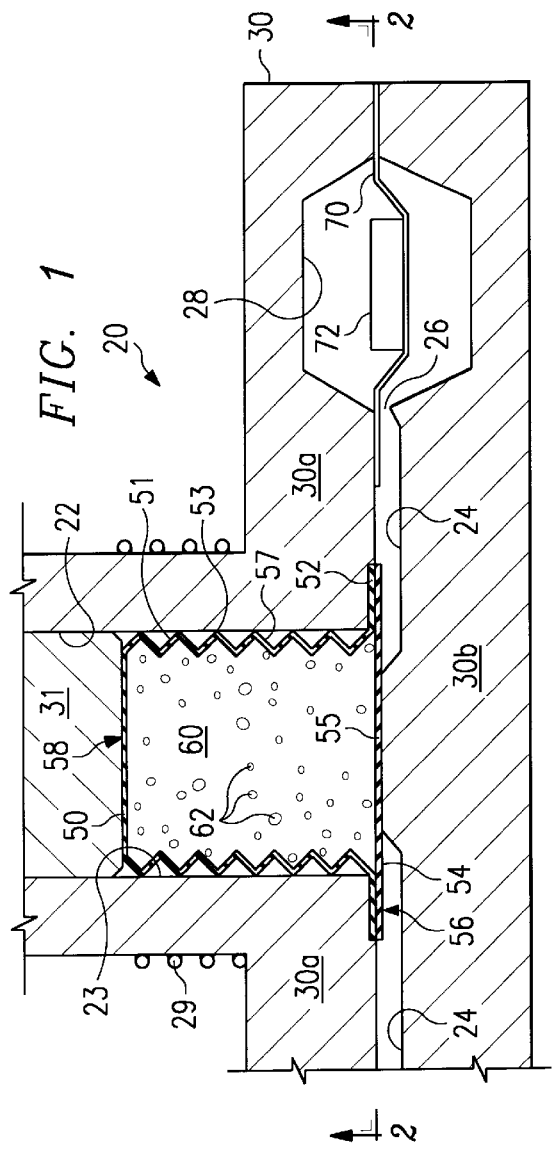
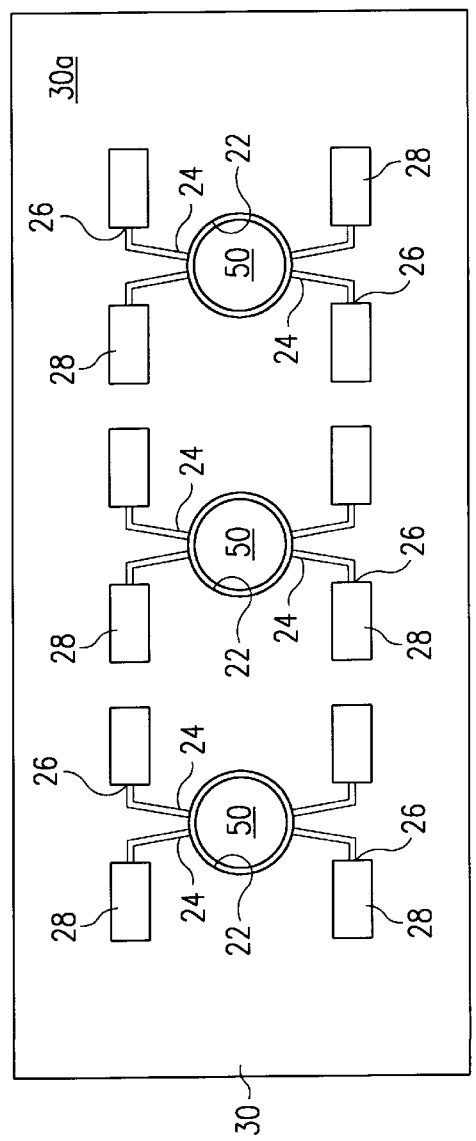

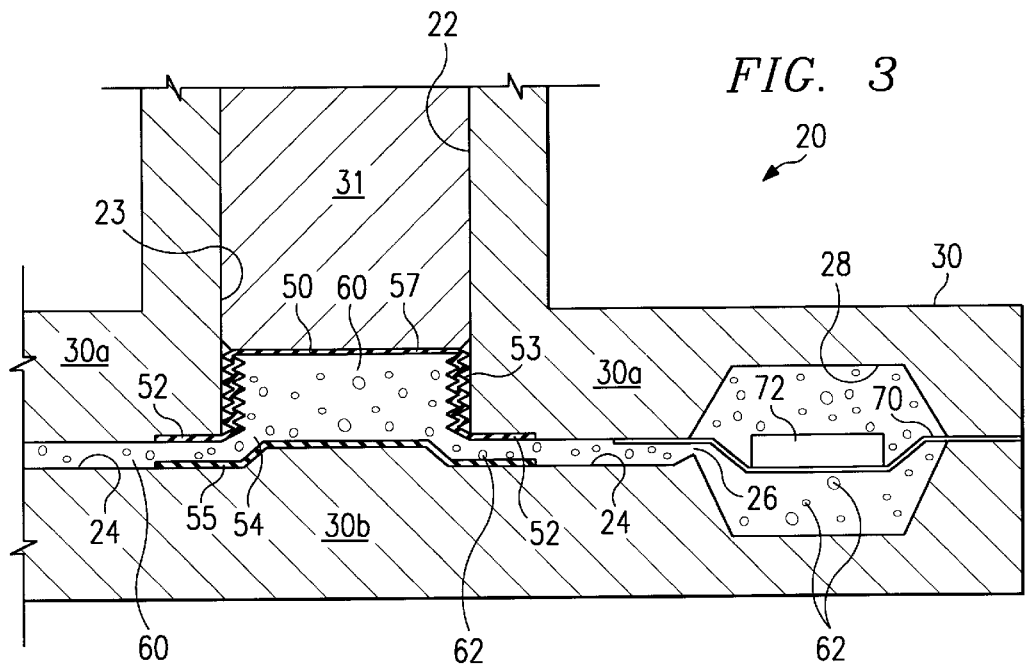
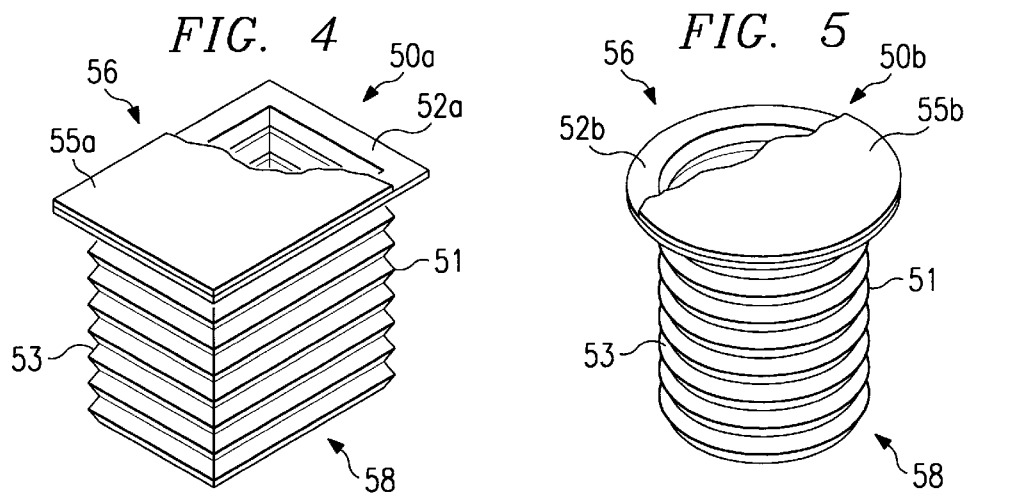
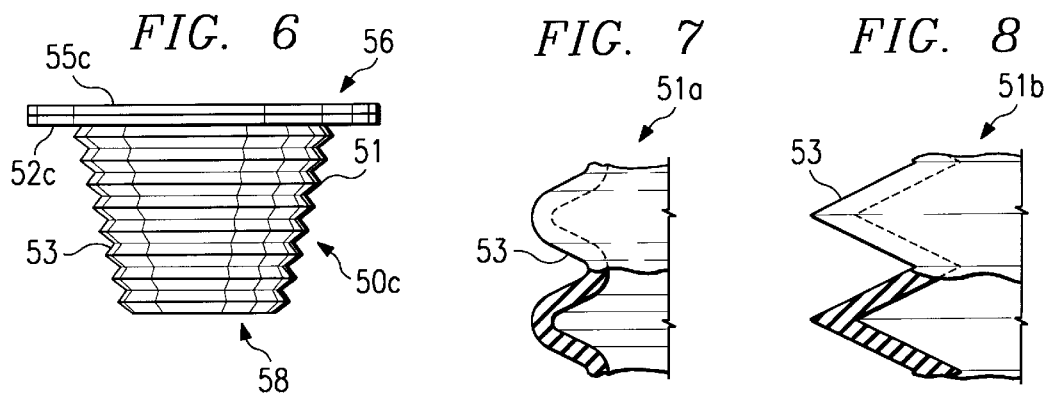

BELLOWS CONTAINER PACKAGING SYSTEM AND METHOD

RELATED APPLICATIONS

This application is related to the following provisional applications: Method and System of Molding, filed Sep. 15, 1998, having a Ser. No. 09/153,746; Molding System and Method, filed Sep. 30, 1998, having a Ser. No. 09/163,743; Vacuum Mold Cavity System and Method, filed Sep. 24, 1998, having a Ser. No. 09/159,652; and Boomerang Molding System and Method, filed Nov. 10, 1998, having a Ser. No. 09/189,318.

This application claims priority under 35 USC § 119 (e)(1) of provisional application Ser. No. 60/060,398, filed Sep. 30, 1997.

TECHNICAL FIELD OF THE INVENTION

This invention relates generally to the molding of plastics and more particularly to a bellows container for packaging molding materials to be used in a molding process.

BACKGROUND OF THE INVENTION

Plastics, or polymers, are used in a variety of products and applications ranging from the simple pen to the complicated wing of an aircraft. Different types of plastic or polymers, as they are technically known, generally have different mechanical, chemical, and electrical properties that allow plastics to be used in many applications. Plastics are typically formed into a product through a molding process, such as transfer molding, injection molding, sheet molding, or blow molding.

For example, plastics are used extensively in the computer and semiconductor industry in a wide variety of applications. One such application is the encapsulation of semiconductor devices, particularly integrated circuits. Encapsulating a semiconductor device in plastic materials protects the device from environmental damage and also provides structural strength to the semiconductor device.

A molding process typically includes a mold containing mold cavities. A system of passages, or runners, is generally contained within the mold and connects a reservoir, or pot, to each or multiple mold cavities. The molding material is non-solidified in the pot during the molding process. Prior to the molding process, the molding material may be a solid or liquid. A plunger sized to fit within the pot may be used to force the non-solidified molding material from the pot through the runner system into the mold cavities. The non-solidified molding material solidifies or hardens and a final molded product, or package, is removed from the mold.

Conventional molding material packaging methods and systems suffer from numerous disadvantages. One disadvantage of conventional molding material packaging methods and systems that use plastic wrappers or thin films is that low viscosity molding materials, such as liquids and putties, cannot be prepackaged into packages that can be placed into the pot of a mold. For example, the plastic wrapper may be torn or not properly sealed, allowing contaminates such as air and moisture to enter the package. A further disadvantage is that during the molding process a prepackaged molding material package may not collapse uniformly in the pot during transfer and may become damaged and leak during the molding process. A leak in the package often requires the pot and plunger to be cleaned before additional molding operations are performed. Problems in the transfer of prepackaged molding materials often causes problems in the final molded product. For example, contamination and incomplete filling of the mold cavities can result in internal voids and defects that often degrade the mechanical, electrical, and chemical properties, as well as the appearance, of the final molded product. In addition, it may be difficult to control the weight and volume of the molding material initially placed into the pot of the mold. Controlling the weight and volume of the molding material initially placed into the pot of the mold is important to the molding process because it helps prevent under filling or over filling of the mold cavities with molding material.

SUMMARY OF THE INVENTION

Accordingly, a need has arisen for an improved packaging system and method. The present invention provides a bellows container packaging system and method that addresses shortcomings of prior packaging systems and methods.

According to an aspect of the invention, a molding system includes a mold having a mold cavity. A pot is connected to the mold cavity by a runner system. A bellows container containing a molding material is disposed within the pot. A plunger operates to apply a load to the bellows container and dispense the molding material through the runner system into the mold cavity.

According to another aspect of the invention, a method for encapsulating a semiconductor device includes forming a mold with a mold cavity connected to a pot by a runner system. A bellows container containing molding material is placed into the pot. The semiconductor device is placed into the mold cavity and the molding material from the bellows container is transferred through the runner system into the mold cavity and encapsulates the semiconductor device. The molding material encapsulating the semiconductor device is allowed to solidify.

The invention provides several technical advantages. For example, the invention allows low viscosity molding materials such as liquids, putties, or the like to be used in conventional closed mold operations, thereby allowing a greater number and range of molding materials with varying properties to be used in the molding process. Closed mold operations typically contain mold cavities that are entirely encapsulated within the mold. Another technical advantage of the present invention is that the bellows container provides greater flexibility in handling, transport, dispensing, and subsequent disposition of the bellows container. Another technical advantage of the present invention is that the bellows container allows low viscosity molding materials to be used in closed mold operations without the need for costly changes in the mold. An additional technical advantage is that the bellows container may be extended or contracted to different levels to accommodate varying volumes of molding materials depending upon the molding application. Yet another technical advantage is that the bellows container provides a shock proof, shatter proof, and highly flexible system for the handling of molding materials that are liquid, paste, putty, or powdered in form.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 1 is a drawing in section with portions broken away showing, in part, a side view of a mold system in accordance with one embodiment of the present invention prior to transfer of a molding material from a bellows container;

FIG. 2 is a cross section of a complete mold system taken in part along line 2—2 of FIG. 1;

FIG. 3 is a drawing in section with portions broken away showing the mold system of FIG. 1 after the molding material has been transferred into a mold cavity;

FIG. 4 is a perspective drawing of a bellows container according to one embodiment of the present invention;

FIG. 5 is a perspective drawing of a bellows container according to another embodiment of the present invention;

FIG. 6 is a schematic drawing illustrating a side view of a bellows container according to another embodiment of the present invention;

FIG. 7 is a partial drawing in section with portions broken away of a fold in a bellows container according to one embodiment of the present invention; and FIG. 8 is a partial drawing in section with portions broken away of a fold in a bellows container according to another embodiment of the present invention.

DETAILED DESCRIPTION OF INVENTION

An embodiment of the present invention and its advantages are best understood by referring to FIGS. 1 through 8 of the drawings, like numerals being used for like and corresponding parts of the various drawings.

The invention relates to the packaging of molding materials for a molding process. In one embodiment the molding materials are contained in a bellows container. Packaging of the molding materials in the bellows container increases the range of different molding materials that can be used. Specifically, a bellows container allows liquid, putty, or other low viscosity molding materials to be used in closed cavity molding in addition to powder molding materials. A bellows container also provides greater flexibility in handling, transporting, dispensing, and subsequent disposition of the bellows container. In addition, the volume of the molding material placed into the bellows container can be accurately determined to reduce defects in a final molded product.

FIG. 1 is a schematic cross section in part illustrating a side view of one embodiment of a mold system 20, and FIG. 2 is a cross section of mold system 20 taken along line 2—2 of FIG. 1. Mold system 20 may include a mold 30 having a mold cavity 28 connected to a pot 22 by a runner system 24, a plunger 31 slidably movable within pot 22, and a bellows container 50 containing a molding material 60 located within pot 22 between plunger 31 and runner system 24. FIG. 1 illustrates plunger 31 in a non-compressive load position, in which plunger 31 is not applying a compressive load to molding material 60 contained within bellows container 50.

Mold 30 may include a first chase 30a and a second chase 30b, which cooperate to form a system of passages and cavities between the chases. Runner system 24 includes gate 26, which forms a transition of runner system 24 to mold cavity 28. Although pot 22 is shown as part of first chase 30a, pot 22 may also be formed as part of second chase 30b. As discussed in greater detail below, bellows container 50 is placed into pot 22 and stores molding material 60 for use in mold system 20. Pot 22 may be formed in any shape or size suitable for molding applications. A plunger 31 corresponding to the shape and size of pot 22 may be slidably disposed within pot 22 to apply a compressive load to molding material 60 contained within bellows container 50. A heating system 29 may be connected to pot 22 to melt molding material 60 contained within bellows container 50. In addition, mold 30 may be heated to accelerate the molding process.

Bellows container 50 may include a closed receptacle 57 having a first end 56 and a second end 58 connected by a side wall 53. First end 56 may include a lid 55 and an opening 54 that opens to dispense molding material 60 into mold cavities 28 through runner system 24 in response to a compressive load from plunger 31. Lid 55 prevents contamination of molding material 60 contained within bellows container 50. First end 56 may also include circumferential lip 52 that operate to form a seal between pot 22 and bellows container 50. Side wall 53 may include folds 51 that operate to collapse and move second end 58 from an extended or first position, as illustrated in FIG. 1, to a collapsed or second position, as illustrated in FIG. 3. The volume associated with bellows container 50 corresponding to the first position of second end 58 is less than the volume associated with bellows container 50 corresponding to the second position of second end 58.

Bellows container 50 may be any suitable shape, size, and configuration depending upon the application. Typically, the shape of bellows container 50 depends upon the shape of pot 22 and the molding characteristics of molding material 60 contained in bellows container 50. For example, bellows container 50 may be generally rectangular in shape, as illustrated in FIG. 4, generally cylindrical in shape, as illustrated in FIG. 5, or include a taper as illustrated in FIG. 6; however, other suitable shapes, sizes, and configurations may be used. Folds 51 may be any suitable shape, size, or configuration that allows side wall 53 to controllably collapse. For example, folds 51 may be generally circular in shape, generally sinusoidal in shape as illustrated in FIG. 7, generally V-shaped as illustrated in FIG. 8, or other shapes. The wall thickness of folds 51 may be designed such that very little molding material 60 is retained in bellows container 50 after bellows container 50 has been collapsed at the completion of the molding process. Folds 51 reduce the contact area between molding material 60 and the surfaces of pot 22 during the molding process. Bellows container 50 also provides a more uniform and consistent heating pattern of molding material 60 than prior packaging methods.

Bellows container 50 may be fabricated in part from numerous materials, such as a polymeric material, crystalline polyethylene terepthalate (CPET), Nylon 4-6, cross-linkable polyethylene, polymethylpentene(TPX) and thermoplastic elastomers. A process for fabricating bellows container 50 may include extrusion blow molding, rotational molding, thermoforming, or blow molding. Multilayer materials may also be used to provide additional performance characteristics such as heat sealing, low friction, and high bending flex resistance of folds 51.

Lid 55 may be any device or system that operates to seal bellows container 50. Molding material 60 is generally vacuum sealed within bellows container 50 to reduce and prevent air from becoming entrained in molding material 60.

Molding material 60 may be any type of plastic or polymer, such as thermosetting plastics or thermoplastics. Prior to the molding process, molding material 60 may be in the form of powder, cold compacted powder in the form of pellets or preforms, or granules. Molding material 60 may also be a low viscosity molding material. Low viscosity molding materials 60 may include liquid, putty, or other very low viscosity molding materials 60 that have a low viscosity during the molding process. Low viscosity molding materials 60 do not typically include powder molding materials 60. Powder, granules and cold compacted powder molding material 60 often contain 10–50% of entrained air 62, while liquid molding material 60 contains much less entrained air 62.

The molding process may be used to encapsulate a semiconductor device 72 in molding material 60. Semiconductor device 72 may be connected to a lead frame 70 that is loaded between first chase 30a and second chase 30b of mold 30. Molding processes that utilize 3P technology may incorporate a layer of release film that is vacuum formed to the surface of each mold cavity 28. When first chase 30a and second chase 30b are assembled to form mold 30, each layer of the release film is compressed and forms a seal surrounding mold cavity 28.

FIG. 3 is a schematic cross section in part of one embodiment of mold system 20 after transfer of molding material 60 from bellows container 50 into mold cavity 28. As illustrated, molding material 60 has been transferred through runner system 24 into mold cavity 28, thereby encapsulating semiconductor device 72. Bellows container 50 is shown collapsed with molding material 60 dispensed into mold 30.

FIGS. 4, 5, and 6 each illustrate different embodiments of bellows container 50. FIG. 4 illustrates a bellows container 50a having a generally rectangular shape with first end 56, a lid 55a, and second end 58 connected by side wall 53. As illustrated, side wall 53 includes folds 51. Bellows container 50a may include a circumferential lip 52a connected to side wall 53 at first end 56 that operates to form a seal between bellows container 50a and pot 22.

FIG. 5 illustrates a bellows container 50b having a generally cylindrical shape with a circumferential lip 52b connected to side wall 53 at first end 56. First end 56 may include a lid 55b that corresponds to the circular shape of circumferential lip 52b.

FIG. 6 illustrates a bellows container 50c that is tapered. Bellows container 50c may have a generally rectangular shape or a generally cylindrical shape and also include a taper as illustrated. Bellows container 50c may include a circumferential lip 52c connected to side wall 53 at first end 56. A lid 55c may be coupled to circumferential lip 52c and may form a vacuum seal. Lids 55, 55a, and 55b may also form a vacuum seal.

FIGS. 7 and 8 each illustrate different embodiments of folds 51 in side wall 53. FIG. 7 illustrates a fold 51a having a generally sinusoidal shape. FIG. 8 illustrates a fold 51b having a generally V-shape. Although these two shapes are particularly shown and described for folds 51, other shapes and configurations may be used without departing from the spirit and scope of the present invention.

In operation, bellows container 50 containing molding material 60 is placed within pot 22 between plunger 31 and runner system 24, as illustrated in FIG. 1. Pot 22 may contain a heating element 29 to melt molding material 60 in bellows container 50. During a transfer phase of the molding process, molding material 60 is transferred from bellows container 50 into mold cavities 28. To transfer molding material 60, plunger 31 extends toward runner system 24, thereby applying a compressive load to non-solidified molding material 60 contained in bellows container 50. In response to the compressive load from plunger 31, folds 51 in side wall 53 collapse in a controlled manner, forcing non-solidified molding material 60 to flow through opening 52 in first end 56 of bellows container 50 into runner system 24, through gate 26 and into mold cavity 28.

During a packing phase, molding material 60 contained within mold cavity 28 is compressed to reduce entrained air and bubbles 62, as illustrated in FIG. 3. To pack molding material 60, plunger 31 extends further toward runner system 24, increasing the compressive load on non-solidified molding material 60 contained within bellows container 50. The increased pressure is communicated through runner system 24 to mold cavity 28, thereby increasing the compressive pressure on non-solidified molding material 60 within mold cavity 28 surrounding semiconductor device 72. Although packing is not always a necessity, its purpose is to reduce the entrained air or bubbles 62 that cause internal voids by compressing air bubbles 62.

Thus the invention provides a packaging system and method that allows the use of low viscosity materials in molding. In addition, the invention facilitates accurate dispensing of a desired amount of molding material to reduce defects in a final molded product.

Although the present invention and its advantages have been described in detail, it should be understood that various changes, substitutions, and alterations can be made therein without departing from the spirit and scope of the present invention as defined by the appended claims.

What is claimed is:

1. A molding system comprising:
   a mold having a mold cavity disposed within the mold;
   a pot connected to the mold cavity through a runner system;
   a bellows container disposed within the pot and having a molding material disposed therein; and
   a plunger slidably disposed within the pot operable to apply a load to the bellows container and dispense the molding material through the runner system into the mold cavity.

2. The molding system of claim 1, wherein the molding material is a low viscosity molding material.

3. The molding system of claim 1, further comprising a heating system operable to liquefy the molding material contained within the bellows container.

4. The molding system of claim 1, wherein the bellows container comprises a closed receptacle having a first end and a second end connected by a side wall, the first end having an opening for dispensing molding materials into the mold, the side wall having at least one fold to allow the plunger to compress the bellows container to dispense the molding materials through the runner system into each mold cavity.

5. The molding system of claim 4, wherein the first end further comprises a circumferential lip operable to form a seal between the bellows container and the mold.

6. The molding system of claim 5, wherein the bellows container includes a lid operable to seal the bellows container.

7. The molding system of claim 6, wherein the lid is vacuum sealed.

8. The molding system of claim 5, wherein the folds in the side wall are sinuscidal in shape.

9. The molding system of claim 1, wherein the bellows container is generally cylindrical in shape.

10. A bellows container for dispensing a molding material into a mold, the bellows container comprising:
    a closed receptacle having a first end and a second end connected by a side wall and containing the molding material;
    wherein the first end includes a lid operable to open for dispensing molding materials into the mold; and
    wherein the side wall comprises at least one fold to allow the second end to move from a first position to a second position, the first position corresponding to a first receptacle volume and the second position corresponding to a second receptacle volume, the second receptacle volume being less than the first receptacle volume.

11. The bellows container of claim 10, wherein the closed receptacle is generally cylindrical in shape.

12. The bellows container of claim 10, wherein the closed receptacle is generally tapered in shape.

13. The bellows container of claim 10, wherein the first end further comprises a circumferential lip operable to form a seal between the bellows container and the mold.

14. The bellows container of claim 10, wherein the folds in the side wall are generally sinusoidal in shape.

15. The bellows container of claim 10, wherein the folds in the side w all are generally V-shaped.

16. The bellows container of claim 10, wherein the molding material is a low viscosity molding material.

17. A method of encapsulating a semiconductor device, the method comprising the steps of:

forming a mold having a mold cavity connected to a pot by a runner system;

disposing a bellows container containing a molding material within the pot;

disposing the semiconductor device within the mold cavity;

transferring the molding material from the bellows container through the runner system into the mold cavity to encapsulate the semiconductor device; and solidifying the molding material within the mold cavity.

18. The method of claim 17, further comprising the step of pressurizing the molding material disposed within the mold cavity.

19. The method of claim 17, wherein the step of disposing a bellows container containing a molding material within the pot comprises the steps of:

forming a bellows container having a lid;

filling the bellows container with a measured amount of a molding material;

vacuum sealing the bellows container containing the molding material; and disposing the bellows container containing the molding material within the pot.

20. The method of claim 19, wherein the step of filling the bellows container comprises the step of filling the bellows container with a measured amount of low viscosity molding material.

* * * * *